(12) United States Patent
Oki

(10) Patent No.: US 6,556,370 B1
(45) Date of Patent: Apr. 29, 2003

(54) METHOD OF WRITING TRACKING SERVO SIGNAL PATTERN FOR MAGNETIC DISK DEVICE

(75) Inventor: Kenji Oki, Kochi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/509,276

(22) PCT Filed: Jul. 27, 1999

(86) PCT No.: PCT/JP99/04011
§ 371 (c)(1),
(2), (4) Date: Jun. 8, 2000

(87) PCT Pub. No.: WO00/07188
PCT Pub. Date: Feb. 10, 2000

(30) Foreign Application Priority Data

Jul. 27, 1998 (JP) .............................................. 10-210619

(51) Int. Cl.$^7$ .............................................. G11B 5/596
(52) U.S. Cl. .................................................. 360/77.02
(58) Field of Search ................................. 360/77.02, 75, 360/51, 77.14, 77.05, 48

(56) References Cited

U.S. PATENT DOCUMENTS

| | | | |
|---|---|---|---|
| 5,307,218 A | | 4/1994 | Kitamura et al. |
| 5,485,322 A | | 1/1996 | Chainer et al. |
| 5,506,823 A | * | 4/1996 | Sanada et al. .............. 369/47.2 |
| 5,570,247 A | | 10/1996 | Brown et al. |
| 5,748,398 A | * | 5/1998 | Seo ............................. 360/51 |
| 5,875,077 A | * | 2/1999 | Uwabo et al. ............ 360/266.2 |
| 5,949,603 A | * | 9/1999 | Brown et al. .................. 360/75 |
| 5,959,802 A | * | 9/1999 | Sato ........................ 360/77.14 |
| 5,991,104 A | * | 11/1999 | Bonyhard ..................... 360/15 |
| 6,181,492 B1 | * | 1/2000 | Bonyhard ..................... 360/17 |
| 6,040,955 A | * | 3/2000 | Brown et al. .................. 360/75 |
| 6,064,541 A | * | 5/2000 | Sasamoto et al. ........ 360/77.05 |
| 6,130,799 A | * | 10/2000 | Sato ........................ 360/77.14 |
| 6,154,330 A | * | 11/2000 | Nakagawa ................... 360/48 |
| 6,292,318 B1 | * | 9/2001 | Hayashi ...................... 360/48 |

FOREIGN PATENT DOCUMENTS

| | | |
|---|---|---|
| JP | 4-248172 | 3/1992 |
| JP | 07-059495 | 3/1995 |
| JP | 07-287951 | 10/1995 |

OTHER PUBLICATIONS

Japanese search report for PCT/JP99/04011 dated Nov. 2, 1999.
English translation of Form PCT/ISA/210.

* cited by examiner

Primary Examiner—David Hudspeth
Assistant Examiner—Fred F. Tzeng
(74) Attorney, Agent, or Firm—RatnerPrestia

(57) ABSTRACT

A method of writing a tracking servo signal pattern for a magnetic disc device includes the steps of recording only a first burst signal and a second burst signal with a servo track writer for writing tracking servo signals, followed thereafter by reproducing the first burst signal and the second burst signal with a magnetic head equipped in the magnetic disc device, and recording a third burst signal and a fourth burst signal with the magnetic head of the magnetic disc device, while controlling a position of the magnetic head in such a manner that a ratio in level of both of the reproduced signals becomes equal to a predetermined proportion.

3 Claims, 5 Drawing Sheets

METHOD OF WRITING TRACKING SERVO SIGNAL PATTERN FOR MAGNETIC DISK DEVICE

This application is a U.S. National Phase application of PCT International application PCT/JP99/04011.

FIELD OF THE INVENTION

The present invention relates to a method of writing a tracking servo signal pattern on a magnetic disc of a magnetic disc device for use in recording and reproducing information with a magnetic head along a concentric information track of a predetermined track pitch on the magnetic disc which is driven into a rotation.

BACKGROUND OF THE INVENTION

For magnetic disc devices such as a hard disc device, it has been a usual practice that a tracking servo signal pattern is recorded in advance at a leading portion in each of a plurality of sectors provided by dividing a concentric information track, in order to record and reproduce information as the concentric information track having a predetermined track pitch on a magnetic disc.

FIG. 4 depicts an example of the tracking servo signal pattern. As shown, a magnetic disc rotates in a direction of an arrow 500, and a magnetic head unit, which includes a reproduction-only magnetic head 12 fixed integrally with a recording magnetic head 14, moves in a diametric direction 510 of the magnetic disc. First burst signals 81 and 82, second burst signals 91 and 92, third burst signals 101 and 102, and fourth burst signals 110, 111 and 112 having predetermined frequencies are recorded in advance as tracking servo signals in respective positions, which are separated in opposite directions with respect to each other from centerlines 131 and 132 of the information tracks along the diametric direction 510 of the magnetic disc, and are shifted from one another in a direction of the centerline 131 of the information track.

The device is so constructed that the reproduction-only head 12 reproduces each of at least two signals out of the first, second, third and fourth burst signals, when recording or reproducing information. The device then records or reproduces the information on a predetermined information track by aligning a position of the recording head 14, while controlling a position of the reproduction-only head 12 in a such manner that a ratio in level between the reproduced signals of the reproduced burst signals becomes equal to a predetermined proportion.

A consideration is given now for an example in that information is recorded on or reproduced from an information track, where the first burst signal 81 and the second burst signal 91 are positioned with respect to the centerline 131 of the information track, as shown in FIG. 4. The device reproduces the first burst signal 81 and the second burst signal 91, and controls a position of the magnetic head unit in a manner that a ratio in level of the first burst signal 81 and the second burst signal 91 becomes equal to a predetermined value, so as to obtain a normal tracking. Or, if the device records or reproduces information on another information track, where the third burst signal 102 and the fourth burst signal 111 are positioned with respect to the centerline 132 of the information track, the device obtains a normal tracking by reproducing the third burst signal 102 and the fourth burst signal 111, and controlling a position of the magnetic head unit in a manner that a ratio in reproduced signal level of the third burst signal 102 and the fourth burst signal 111 becomes equal to a predetermined value.

As a conventional method of writing the tracking servo signal pattern having the afore-noted first, second, third and fourth burst signals on a magnetic disc, a device called "servo track writer" designed exclusively for writing has been used. The servo track writer records the first, second, third and fourth burst signals 81, 82, 91, 92, 101, 102, 110, 111, 112 and so on by controlling a position as well as a recording and an erasing timings of a magnetic head unit provided in a magnetic disc device with a control system of the servo track writer, while rotating the magnetic disc of the magnetic disc device.

A conventional method of writing the tracking servo signal pattern using a servo track writer will be described hereinafter by referring to FIG. 5.

Firstly, the recording head 14 is aligned in a position where a burst signal 81a is to be written, and the burst signal 81a is written in. A time required for this process is the sum of an aligning time and a time for the disc to rotate for a full turn. Then, the recording head 14 is aligned in another position where a burst signal 101a is to be written, and the burst signal 101a is written in. A time required for this process is also the sum of the aligning time and the time for the disc to rotate for a full turn.

Next, the recording head 14 is aligned in a position where a burst signal 91a is to be written in the diametric direction 510 of the magnetic disc, and the burst signal 91a is written immediately after demagnetizing a portion 81b of the already written burst signal 81a. A time required for this process is also the sum of the aligning time and the time for the disc to rotate for a full turn. The recording head 14 is then aligned in a position where a burst signal 111a is to be written in the diametric direction 510 of the magnetic disc, and the burst signal 111a is written immediately after demagnetizing a portion 101b. A time required for this process is the sum of the aligning time and the time for the disc to rotate for a full turn.

Then, the recording head 14 is aligned in a position where a burst signal 82a is to be written, and a portion 91b is demagnetized immediately after writing the burst signal 82a. A time required for this process is the sum of the aligning time and the time for the disc to rotate for a full turn.

All of the burst signals are written by repeating the process described above. Hence, a time necessary for writing can be given by the following formula:

(aligning time+time for a disc to rotate for a full turn)×number of burst signals However, a servo track writer for use in the foregoing writing method is very expensive equipment. Therefore, it is desirable for such expensive equipment to be utilized efficiently. However, it has not necessarily been utilized efficiently, since all of the first, second, third, and fourth burst signals are recorded under control of the servo track writer, as has been described.

SUMMARY OF THE INVENTION

A portion of the tracking servo signals or a special signal of the magnetic disc device is written under control of a control system of the servo track writer and writing the rest of the tracking servo signals thereafter under control of the magnetic disc device's own control system based on the already written tracking servo signals without using the servo track writer.

Thus, method of writing a tracking servo signal pattern for a magnetic disc device in accordance with an exemplary embodiment of the present invention includes the steps of: recording a set of tracking servo signals out of a plurality of sets with a magnetic head unit equipped within the magnetic disc device under control of a control system of a writing device of tracking servo signals ("servo track writer"); reproducing the set of tracking servo signals with the magnetic head unit equipped in the magnetic disc device under control of a control system of the magnetic disc device by itself; and recording tracking servo signal pattern not yet recorded among the plurality of sets with the magnetic head unit equipped in the magnetic disc device, while controlling a position of the magnetic head unit under control of a control system of the magnetic disc device by itself based on the reproduced signals.

According to this method, a utilization efficiency of the servo track writer is improved by at least equal to or more than double, since the servo track writer records only one set of the tracking servo signals. Also, the invention does not necessitate any consideration, in particular, for utilization efficiency and so on of a special equipment such as the servo track writer because the tracking servo signal pattern of the other set are recorded by magnetic head units equipped in the magnetic disc devices themselves under control of the control systems of the individual magnetic disc devices themselves.

In addition, a method of writing a tracking servo signal pattern for a magnetic disc device of the present invention includes: recording a first burst signal and a second burst signal with a magnetic head unit equipped within the magnetic disc device under control of the control system of the writing device of tracking servo signals; followed thereafter by reproducing the first burst signal and the second burst signal with the magnetic head unit equipped in the magnetic disc device under control of a control system of the magnetic disc device by itself; and recording patterns of a third burst signal and a fourth burst signal with the magnetic head unit equipped in the magnetic disc device, while controlling a position of the magnetic head unit in a manner that a ratio in level of both of the reproduced signals becomes equal to a predetermined value.

According to this method, a utilization efficiency of the servo track writer is improved by at least equal to or more than double, because only the first and the second burst signals are recorded under control of the control system of the servo track writer, and patterns of the third and the fourth burst signal are recorded by the magnetic head units equipped in the magnetic disc devices themselves under control of the control systems of the individual magnetic disc devices themselves.

DESCRIPTION OF THE PREFERRED EMBODIMENTS

First Exemplary Embodiment

Figure 1:
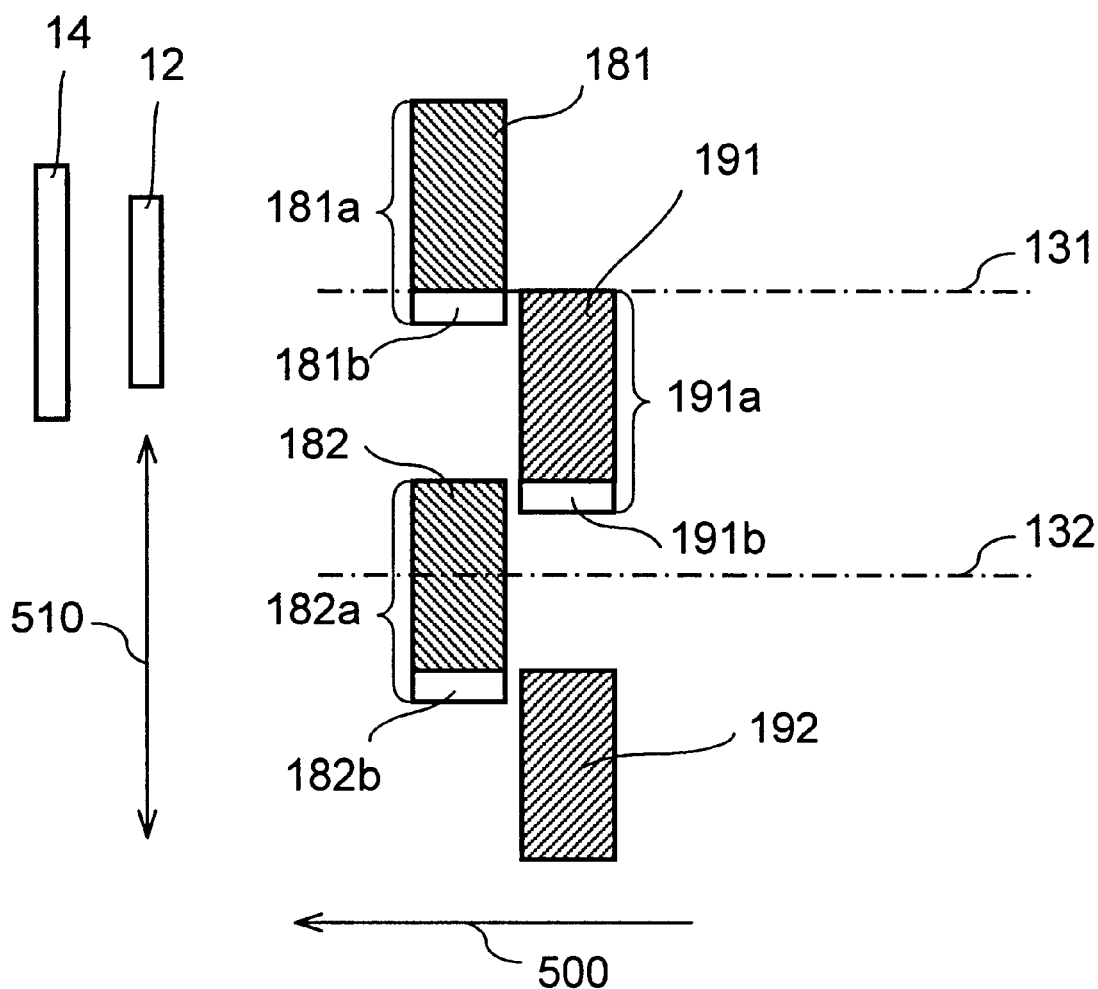
FIG. 1 depicts a tracking servo signal pattern recorded on a magnetic disc during a first half of the recording process in a method of writing tracking servo signal pattern for magnetic disc device of a first exemplary embodiment of the present invention.

A method of writing a tracking servo signal pattern for a magnetic disc device of a first exemplary embodiment of the present invention will be described by referring to FIG. 1 and FIG. 2. All structural elements that are identical to those of the prior art are assigned the same reference numerals, and description of them will be skipped.

Figure 2:
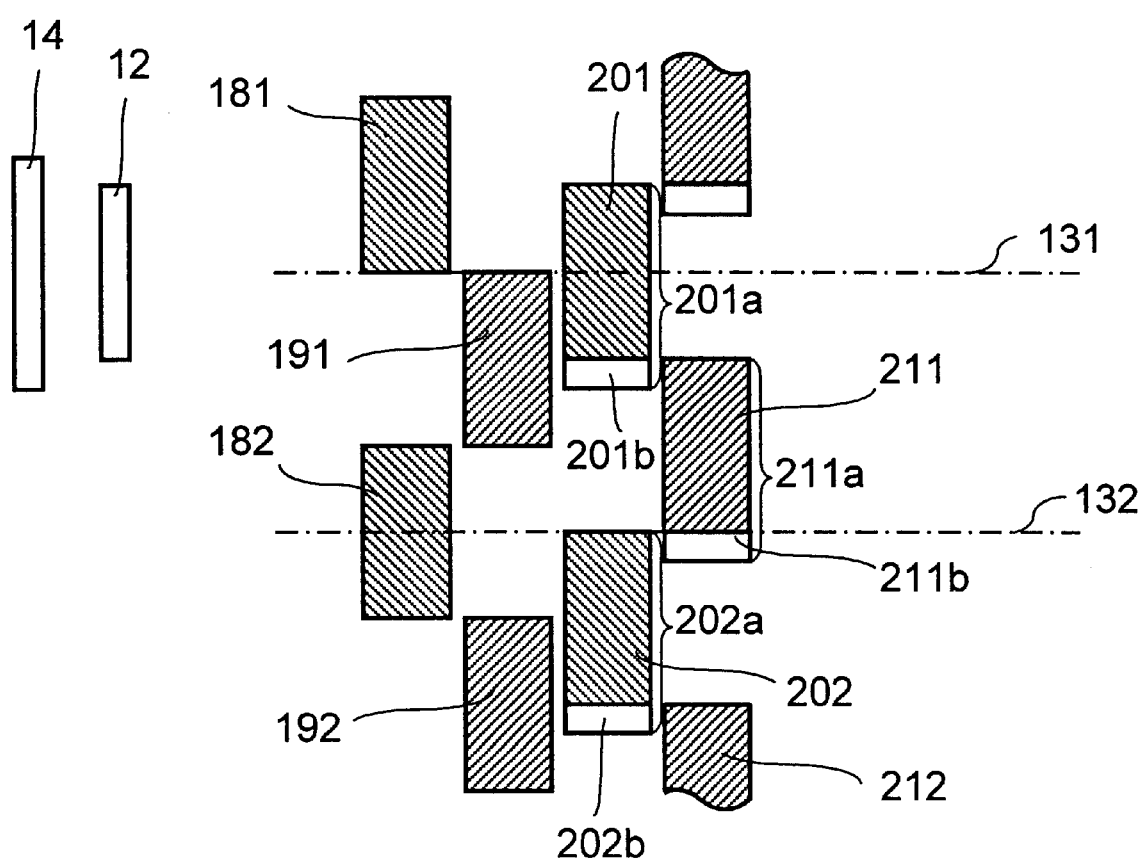
FIG. 2 depicts a tracking servo signal pattern recorded on the magnetic disc during a last half of the recording process and a result of the same, in the method of the first exemplary embodiment.

First, a servo track writer is used for recording a first burst signal 181a in a width of a recording magnetic head 14 as shown in FIG. 1 using a reproduction-only magnetic head 12 and the recording head 14, which are integrally united in a predetermined dimensional relation with each other, in a magnetic disc device under control of a servo track writer, during a first rotation of a magnetic disc of the magnetic disc device, while driving the magnetic disc of the magnetic disc device to rotate in a direction of an arrow 500 using the servo track writer in the same manner as the conventional method. It then records a second burst signal 191a in a width of the recording head 14 during the next rotation, after changing a position of the recording head 14 toward a direction of an arrow 510. The method is so devised that a part of the recording head 14 scans a portion 181b of the first burst signal 181a during the rotation for recording the second burst signal 191a, so as to erase the portion 181b of the first burst signal 181a in the course of scan in order to obtain a first burst signal 181 of a regular servo track width.

The servo track writer records a first burst signal 182a in a width of the recording head 14 during the next rotation after changing a position of the recording head 14, in the same manner as above; The method is so devised also that a part of the recording head 14 scans a portion 191b of the second burst signal 191a during the rotation for recording the first burst signal 182a. The recording head 14 erases the portion 191b of the second burst signal 191a in the course of scan, so as to obtain a second burst signal 191 of the regular servo track width. The first burst signals 181, 182, - - - and the second burst signals 191, 192, - - - in a predetermined servo track width can be accurately recorded in predetermined positions on the magnetic disc, under the control of the servo track writer, by repeating the foregoing steps.

The magnetic disc device is disconnected, thereafter, from the servo track writer, and the first burst signal 181 and the second burst signal 191 are reproduced by a reproduction head 12 with the magnetic disc device's own control system. Then, the magnetic disc device records a third burst signal 201 and a fourth burst signal 211, as shown in FIG. 2, with the recording head 14, which is integrally united with the reproduction head 12 in a predetermined dimensional relation to each other, while controlling a position of the reproduction head 12 in such a manner that a ratio in level between both of the reproduced signals becomes equal to a predetermined proportion, in the similar steps as have taken in recording the first burst signal 181 and the second burst signal 191. The third burst signal 201 is in a predetermined position with respect to the first burst signal 181 and the second burst signal 191, and the fourth burst signal 211 is in another predetermined position with respect to the first burst signal 182 and the second burst signal 192.

In other words, the method is so devised that the recording head 14 records a third burst signal 201a in a width of the recording head 14 during the first rotation, and that a part of the recording head 14 scans over a portion 201b of the third burst signal 201a during the next rotation for recording the fourth burst signal 211a. Thus, the recording head 14 erases the portion 201b of the third burst signal 201a in the course of scan, so as to obtain a third burst signal 201 of the regular servo track width. In the same manner as above, the recording head 14 erases a portion 211b of the fourth burst signal 211a during a rotation for recording a third burst signal 202a, so as to obtain a fourth burst signal 211 of the regular servo track width. The third burst signals 201, 202, - - - and the fourth burst signals 211, 212, - - - in the predetermined servo track width can be recorded accurately on predetermined positions by repeating the foregoing steps.

According to this exemplary embodiment, the servo track writer records only the first burst signals 181, 182, - - - and the second burst signals 191, 192, - - - . Hence, the invention improves a utilization efficiency of the servo track writer by at least equal to or more than double, as compared to the conventional method in that the servo track writer is required to also record the third burst signals 101, 102, - - - and the fourth burst signals 111, 112, - - - . Incidentally, the invention does not necessitate any consideration, in particular, for a utilization efficiency and so on of a special equipment such as the servo track writer, because patterns of the third burst signals and the fourth burst signals are recorded by control systems of individual magnetic disc devices by themselves.

Second Exemplary Embodiment

Figure 3A:
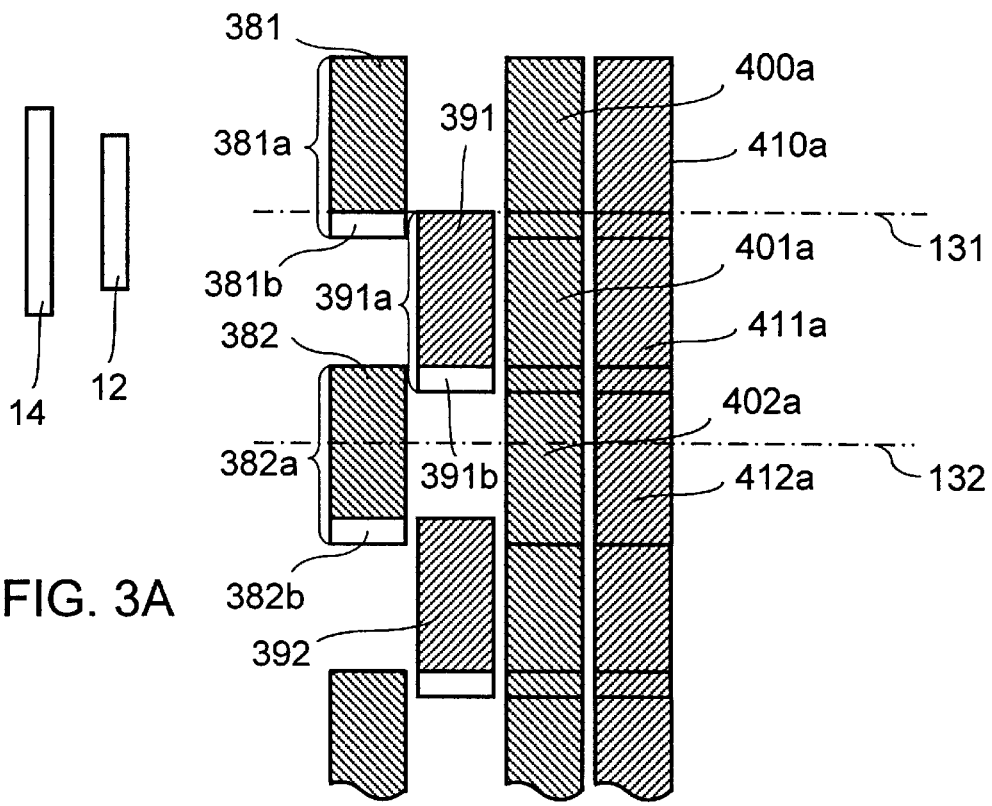
FIG. 3A depicts a tracking servo signal pattern recorded on a magnetic disc during a first half of the recording process in a method of writing tracking servo signal pattern for magnetic disc device of a second exemplary embodiment of the present invention.
Figure 3B:
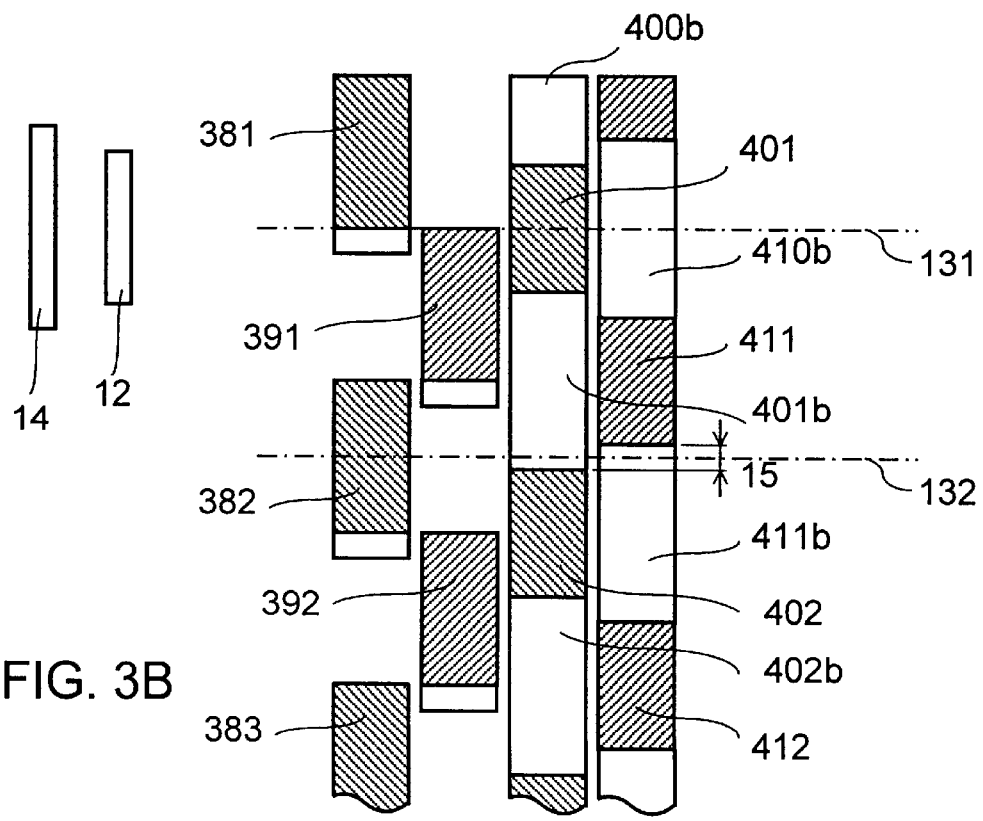
FIG. 3B depicts a tracking servo signal pattern recorded on the magnetic disc during a last half of the recording process and a result of the same, in the method of writing tracking servo signal pattern for magnetic disc device of the second exemplary embodiment of the present invention.
Figure 4:
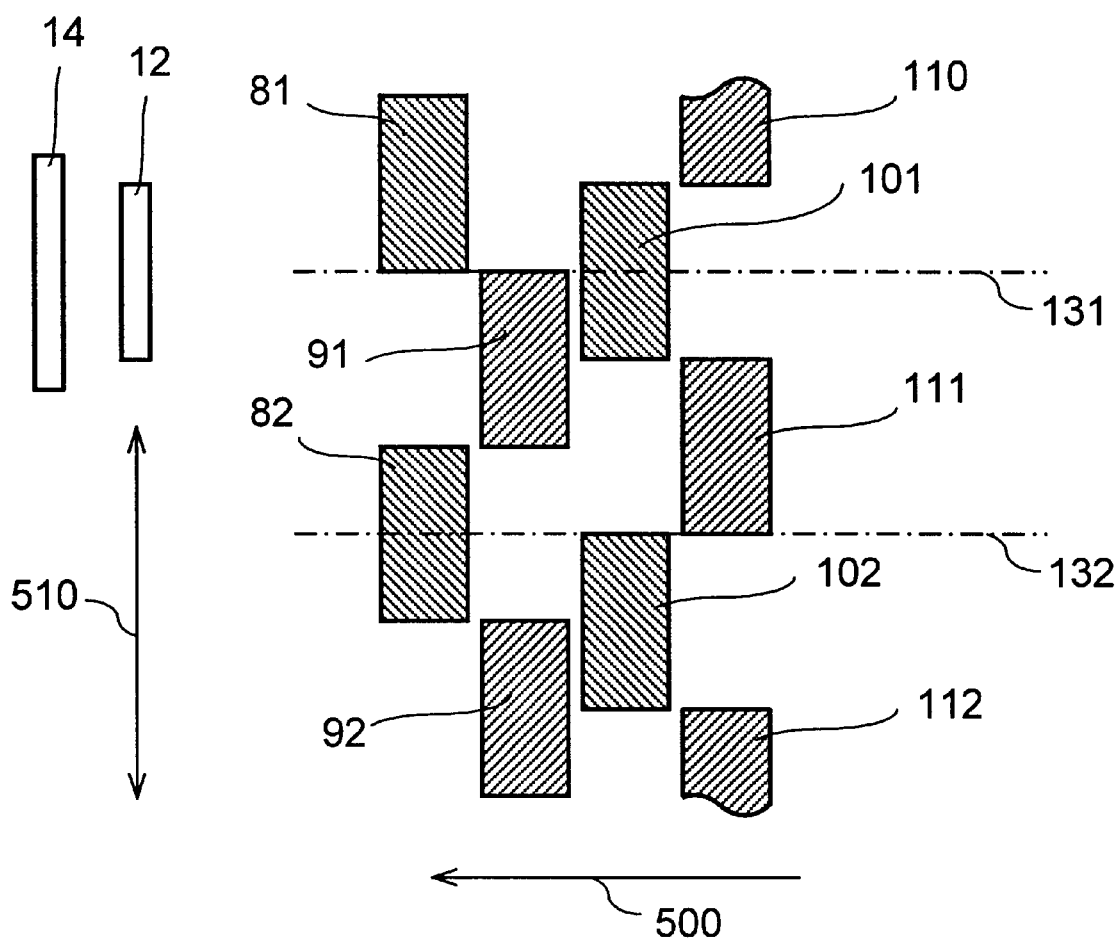
FIG. 4 depicts an example of tracking servo signal pattern in a magnetic disc device of the prior art.
Figure 5:
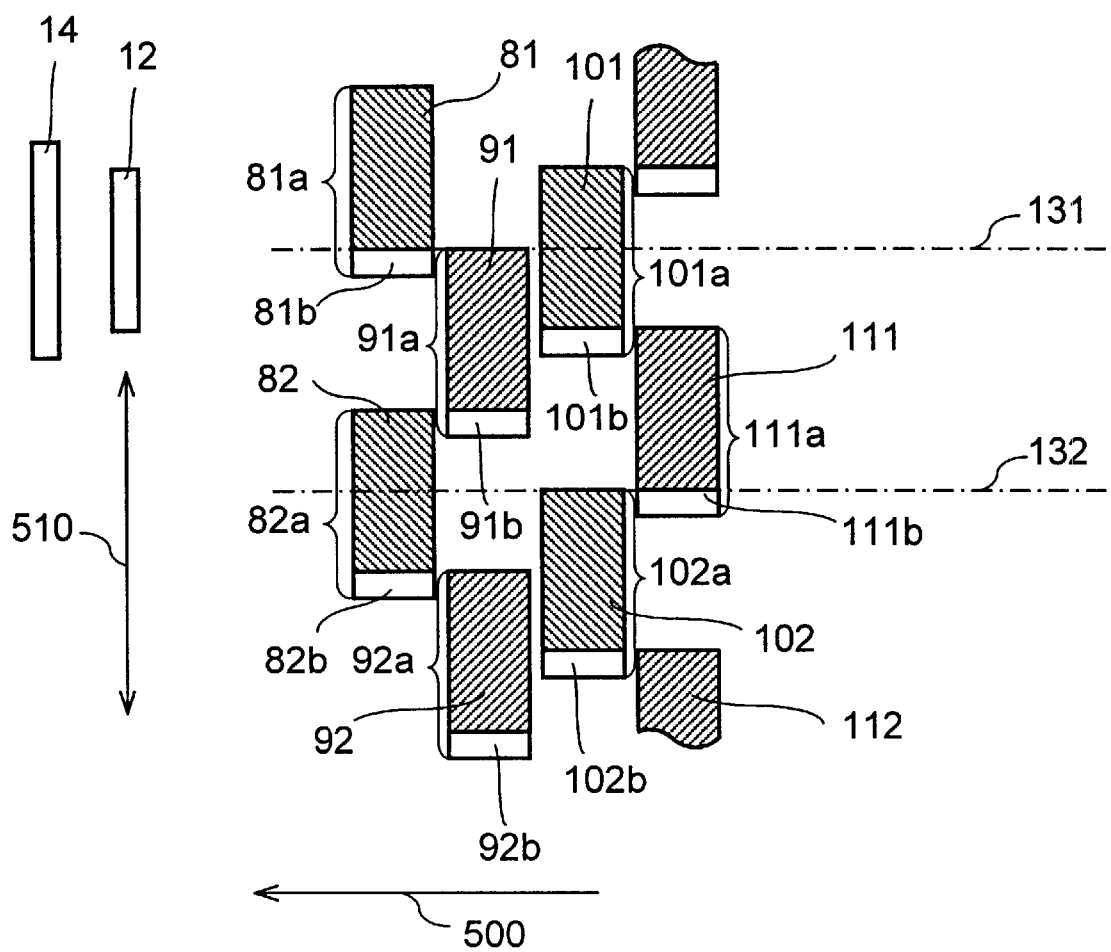
FIG. 5 depicts a method of writing the tracking servo signal pattern in the magnetic disc device of the prior art.

A method of writing a tracking servo signal pattern for a magnetic disc device of a second exemplary embodiment of the present invention will be described next by referring to FIG. 3A and FIG. 3B.

A servo track writer records first burst signals 381, 382, - - - and second burst signals 391, 392, - - - on a disc, under control of the servo track writer, in the same manner as the foregoing first exemplary embodiment. In the present exemplary embodiment, however, the servo track writer records on the disc a third burst signal 400a and a fourth burst signal 410a at the same time when it records a first burst signal 381a. A time required for this process is the sum of an aligning time and a time for the disc to rotate for a full turn. Then, the servo track writer records a third burst signal 401a and a fourth burst signal 411a at the same time when it records a second burst signal 391a on the disc. A time required for this process is still the sum of the aligning time and the time for the disc to rotate for a full turn.

As a result of the above steps, the servo track writer records the third burst signal 401a in such a manner that a portion of the secondly recorded third burst signal 401a overlaps a portion of the formerly recorded third burst signal 400a. Also, it records the fourth burst signal 411a in such a manner that a portion of the latterly recorded fourth burst signal 411a overlaps a portion of the formerly recorded fourth burst signal 410a. The above steps make the third burst signals and the fourth burst signals as continuous patterns recorded along a diametric direction of the disc. Further, the overlapping third burst signal and the fourth burst signal are recorded with their phases being in coincidence with those of the formerly recorded third burst signal and the fourth burst signal.

Subsequently, the magnetic disc device is disconnected from the servo track writer, and the recording head 14 erases unnecessary portions of the continuous patterns of the third burst signal and the fourth burst signal under the control of the magnetic disc device's own control system, so as to obtain a third burst signal and a fourth burst signal of a predetermined width. In other words, the magnetic disc device reproduces the first burst signal 381 and the second burst signal 391 with the reproduction head 12, and it erases a portion 400b of the third burst signal 400a with the recording head 14, while controlling a position of the reproduction head 12 in such a manner that a ratio in level between both of the reproduced signals becomes equal to a predetermined proportion, thereby obtaining a third burst signal 401 of a predetermined width, as shown in FIG. 3B. In the same manner, the magnetic disc device obtains a fourth burst signal 411 of a predetermined width by erasing a portion 410b of the fourth burst signal 411a.

Also, the magnetic disc device reproduces the first burst signal 382 and the second burst signal 392, and erases a portion 401b of the third burst signal 402a with the recording head 14, while controlling a position of the reproduction head 12 in a manner that a ratio in level between both of the reproduced signals becomes equal to a predetermined proportion, to obtain a third burst signal 402 of the predetermined width. In the same manner, the magnetic disc device obtains a fourth burst signal 412 of the predetermined width by erasing a portion 411b of the fourth burst signal 412a. Accordingly, the third burst signals 401, 402, - - - and the fourth burst signals 411, 412, - - - of nearly the predetermined servo track width can be formed on predetermined positions by repeating the foregoing steps.

The described method may occasionally produce a gap 15 between, for instance, the third burst signal 402 and the fourth burst signal 411 in a diametric direction of the disc, due to an interrelation between a width of the servo track and a width of the recording magnetic head. However, this gap 15 does not pose a problem for practical purposes, since it is comparatively smaller than the width of the reproduction head 12. The gap 15 can be reduced even farther by making the width of the recording magnetic head closer to two thirds of the width of the servo track.

The servo track writer records the first burst signals 381, 382, - - - and the second burst signals 391, 392, - - - as well as the third burst signal patterns 400a, 401a, - - - and the fourth burst signal patterns 410a, 411a, - - - along extended lines of the recording tracks, also with this exemplary embodiment. Since final forms of the third burst signals 401, 402, - - - and the fourth burst signals 411, 412, - - - are formed by taking an erasing step with the magnetic head under the control of the individual magnetic disc devices' control systems, the invention does not necessitate any consideration, in particular, for a utilization efficiency and so on of a special equipment such as the servo track writer. Hence, it improves the utilization efficiency of the servo track writer by at least equal to or more than double.

In the foregoing exemplary embodiments of the present invention, the burst signals have been described taking examples having one set or two sets. These are, however, not restrictive. Rather, any plural number of the burst signals may be recorded on the magnetic disc, by first recording at least one set of the burst signals amongst plural series of burst signals with a tracking servo signal writing device such as a servo track writer, followed by recording the rest of unrecorded burst signals amongst the plural number of burst signals with a magnetic head equipped in the magnetic disc device under the control of the magnetic disc device's own control system, as needless to mention.

INDUSTRIAL APPLICABILITY

In the present invention, as has been described, the servo track writer, as being an expensive device, records only the first and the second burst signals, or the first and the second burst signals as well as the third burst signal patterns and the fourth burst signal patterns along an extended line along the recording tracks of the first and the second burst signals. Hence, the invention improves a utilization efficiency of the servo track writer by at least equal to or more than double. Since final forms of the third burst signals and the fourth burst signals are formed by taking a recording step or an erasing step using individual magnetic disc devices' own magnetic heads, the invention does not necessitate any consideration, in particular, for the utilization efficiency and so on of a special equipment such as the servo track writer. Accordingly, the invention advances streamlining of a manufacturing process of the magnetic disc devices, and contributes to a reduction in their cost.

What is claimed is:

1. A method of writing a tracking servo signal pattern for a magnetic disc device, which device records and reproduces information with a magnetic head unit, and which device reproduces at least two burst signals out of first, second, third and fourth burst signals recorded as tracking servo signals, and which device also records and reproduces the information, said method comprising:

recording the first burst signal and second burst signal on the magnetic disk;

reproducing the first burst signal and second burst signal by the magnetic head unit of the magnetic disc device;

controlling a position of the magnetic head unit under control of the magnetic disk device such that a ratio in level between said first tracking servo signal and said second tracking servo signal reproduced by the magnetic head unit of the magnetic disc device are substantially equal to a predetermined value;

recording the third burst signal and fourth burst signal by the magnetic head unit of the magnetic disc device;

recording a third burst signal pattern and a fourth burst signal pattern respectively in a width equal to or greater than a predetermined recording width when recording said first burst signal and said second burst signal;

reproducing said first burst signal and said second burst signal with said magnetic head unit of the magnetic disc device per se; and controlling a position of said magnetic head unit under control of said magnetic disc device such that a ratio in level between said reproduced first burst signal and second burst signal becomes equal to a predetermined proportion, recording said third burst signal and said fourth burst signal of the predetermined recording width by erasing portions of said third burst signal pattern and said fourth burst signal pattern.

2. The method of writing a tracking servo signal pattern for a magnetic disc device according to claim 1, wherein said tracking servo signals are ⅔ of the servo track width.

3. A method of writing a tracking servo signal pattern according to claim 1, wherein the tracking servo signals are recorded at positions apart from each other in a diameter direction of the magnetic disk with regard to a center of information track and deviated with each other in the information track direction as well as at the beginning of each sector having the concentric tracks divided into a plurality of sectors.

* * * * *